United States Patent
Luo et al.

(10) Patent No.: US 9,363,769 B2
(45) Date of Patent: Jun. 7, 2016

(54) METHODS AND SYSTEMS FOR SRS POWER SCALING IN CARRIER AGGREGATION

(75) Inventors: Tao Luo, San Diego, CA (US); Wanshi Chen, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 337 days.

(21) Appl. No.: 13/100,252

(22) Filed: May 3, 2011

(65) Prior Publication Data
US 2011/0275335 A1 Nov. 10, 2011

Related U.S. Application Data

(60) Provisional application No. 61/331,769, filed on May 5, 2010.

(51) Int. Cl.
*H04W 52/28* (2009.01)
*H04W 52/34* (2009.01)
(Continued)

(52) U.S. Cl.
CPC .......... *H04W 52/281* (2013.01); *H04W 52/346* (2013.01); *H04W 52/367* (2013.01); *H04W 52/146* (2013.01); *H04W 52/34* (2013.01); *H04W 52/42* (2013.01)

(58) Field of Classification Search
CPC ............ H04W 52/281; H04W 52/346; H04W 52/367; H04W 52/146; H04W 52/34; H04W 52/42
USPC .......... 375/259–260, 267; 370/252, 328, 329, 370/334, 345; 455/127.1–127.2, 450, 522
See application file for complete search history.

(56) References Cited

U.S. PATENT DOCUMENTS

| 8,705,397 B2* | 4/2014 | Ahn ................ H04W 52/16 370/252 |
| 2009/0197632 A1 | 8/2009 | Ghosh et al. |

(Continued)

FOREIGN PATENT DOCUMENTS

| CN | 1716837 A | 1/2006 |
| WO | 2006103067 A1 | 10/2006 |

(Continued)

OTHER PUBLICATIONS

Qualcomm Incorporated: "UL Power Control for Multicarrier Operation", 3GPP Draft; R1-100677 UL Power Control for MC, 3rd Generation Partnership Project (3GPP), Mobile Competence Centre ; 650, Route Des Lucioles ; F-06921 Sophia-Antipolis Cedex ; France, vol. RAN WG1, No. Valencia, Spain; 201 00118, Jan. 12, 2010.*

(Continued)

*Primary Examiner* — Daniel Washburn
*Assistant Examiner* — Eboni Hughes
(74) *Attorney, Agent, or Firm* — Paul Kuo

(57) ABSTRACT

Certain aspects of the present disclosure relate to techniques for scaling transmission power. According to certain aspects, a technique for scaling transmission power may include scaling transmission power of one or more uplink channel symbols to be transmitted in a subframe, utilizing a first set of one or more scaling coefficients, scaling transmission power of one or more sounding reference signal (SRS) symbols to be transmitted in the same subframe, utilizing a second set of one or more scaling coefficients, wherein the first set of scaling coefficients is different from the second set of scaling coefficients, and transmitting the scaled one or more uplink channel symbols and the scaled one or more SRS symbols utilizing the scaled transmission power values.

37 Claims, 10 Drawing Sheets

(51) Int. Cl.
*H04W 52/36* (2009.01)
*H04W 52/14* (2009.01)
*H04W 52/42* (2009.01)

(56) References Cited

U.S. PATENT DOCUMENTS

| | | | | |
|---|---|---|---|---|
| 2011/0268028 | A1* | 11/2011 | Stern-Berkowitz | H04L 27/2613 370/328 |
| 2011/0275403 | A1* | 11/2011 | Chen | H04W 52/146 455/522 |
| 2011/0280169 | A1* | 11/2011 | Seo | H04W 52/146 370/311 |
| 2011/0287804 | A1* | 11/2011 | Seo | H04W 52/146 455/522 |
| 2012/0039273 | A1* | 2/2012 | Nam | H04L 5/0005 370/329 |

FOREIGN PATENT DOCUMENTS

| | | |
|---|---|---|
| WO | 2010098593 A2 | 9/2010 |
| WO | 2010107880 A2 | 9/2010 |

OTHER PUBLICATIONS

Ericsson: "DC-HSUPA power scaling", 3GPP Draft; R1-091894 DC-HSUPA Power Scaling, 3rd Generation Partnership Project (3GPP), Mobile Competence Centre ; 650, Route Des Lucioles ; F-06921 Sophia-Antipolis Cedex ; France, No. San Francisco, USA; Apr. 28, 2009.*

Motorola: "ULPC: Simultaneous transmission of PUCCH and PUSCH in case of power limitation," 3GPP TSG RAN 1#59b s, R1-100201, Jan. 2010.*

Ericsson: "DC-HSUPA power scaling" 3GPP Draft; R1-091894 DC-HSUPA Power Scaling, 3rd Generation Partnership Project (3GPP), Mobile Competence Centre ; 650, Route Des Lucioles ; F-06921 Sophia-Antipolis Cedex ; France, No. San Francisco, USA; Apr. 28, 2009, XP050339385.

Interdigital Communication LLC: "Power scaling for data and control channel QQ HSUPA" 3GPP Draft, R1-092599, 3rd Generation Partnership Project (3GPP), Mobile Competence Centre, 650, Route Des Lucioles, F-06921 Sophia Antipolis Cedex, France, No. Los Angeles, USA, Jun. 24, 2009, XP050351093.

International Search Report and Written Opinion—PCT/US2011/035400-ISA EPO—Aug. 10, 2011.

Qualcomm Incorporated: "UL Power Control for Multicarrier Operation" 3GPP Draft; R1-100677 UL Power Control for MC, 3rd Generation Partnership Project (3GPP), Mobile Competence Centre ; 650, Route Des Lucioles ; F-06921 Sophia-Antipolis Cedex ; France, vol. RAN WG1, No. Valencia, Spain; Jan. 18, 2010, Jan. 12, 2010, XP050418270 [retrieved on Jan. 12, 2010] the whole document.

Alcatel-Lucent et al., "Way Forward on UL Power Control with Carrier Aggregation," 3GPP TSG RAN WG1 #60bis, R1-102563, Apr. 2010.

Motorola: "ULPC: Simultaneous transmission of PUCCH and PUSCH in case of power limitation," 3GPP TSG RAN1#59bis, R1-100201, Jan. 2010.

Taiwan Search Report—TW100115833—TIPO—Oct. 17, 2013.
Taiwan Search Report—TW100115833—TIPO—Dec. 5, 2014.

CATT: "Further considerations on LTE-A uplink power control", 3GPP Draft; R1-101762, 3rd Generation Partnership Project (3GPP), Mobile Competence Centre ; 650, Route Des Lucioles ; F-06921 Sophia-Antipolis Cedex ; France, vol. RAN WG1, No. Beijing, china; Apr. 12, 2010, Apr. 6, 2010, KP050419171, [retrieved on Apr. 6, 2010].

Huawei: "UL Power Control in Carrier Aggregation", 3GPP Draft; R1-093840 UL Power Control in Carrier Aggregation, 3rd Generation Partnership Project (3GPP), Mobile Competence Centre ; 650, Route Des Lucioles ; F-06921 Sophia-Antipolis Cedex; France, No. Miyazaki; Oct. 12, 2009, XP050388347, [retrieved on Oct. 6, 2009] p. 1, paragraph 2.1-p. 3, paragraph.

Qualcomm Incorporated: "Details on UL power control in carrier aggregation setting", 3GPP Draft; R1-101480 UL Power Control for MC, 3rd Generation Partnership Project (3GPP), Mobile Competence Centre; 650, Route Des Lucioles; F-06921 Sophia-Anti Polis Cedex; France, vol. RAN WG1, No. San Francisco, USA; Feb. 22, 2010, Feb. 16, 2010, XP050418934 [retrieved on Feb. 16, 2010] the whole document.

* cited by examiner

METHODS AND SYSTEMS FOR SRS POWER SCALING IN CARRIER AGGREGATION

CLAIM OF PRIORITY UNDER 35 U.S.C. §119

The present Application for Patent claims priority to U.S. Provisional Application No. 61/331,769, entitled, "SRS Power Scaling in Carrier Aggregation," filed May 5, 2010, and assigned to the assignee hereof and hereby expressly incorporated by reference herein.

TECHNICAL FIELD

Certain aspects of the present disclosure generally relate to wireless communications and, more particularly, to power scaling in multi-carrier systems.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, $3^{rd}$ Generation Partnership Project (3GPP) Long Term Evolution (LTE) systems, and Orthogonal Frequency Division Multiple Access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

SUMMARY

Certain aspects of the present disclosure provide a method for wireless communications. The method generally includes scaling transmission power of one or more uplink channel symbols to be transmitted in a subframe, utilizing a first set of one or more scaling coefficients, scaling transmission power of one or more sounding reference signal (SRS) symbols to be transmitted in the same subframe, utilizing a second set of one or more scaling coefficients, wherein the first set of scaling coefficients is different from the second set of scaling coefficients, and transmitting the scaled one or more uplink channel symbols and the scaled one or more SRS symbols utilizing the scaled transmission power values.

Certain aspects of the present disclosure provide an apparatus for wireless communications. The apparatus generally includes means for scaling transmission power of one or more uplink channel symbols to be transmitted in a subframe, utilizing a first set of one or more scaling coefficients, means for scaling transmission power of one or more sounding reference signal (SRS) symbols to be transmitted in the same subframe, utilizing a second set of one or more scaling coefficients, wherein the first set of scaling coefficients is different from the second set of scaling coefficients, and means for transmitting the scaled one or more uplink channel symbols and the scaled one or more SRS symbols utilizing the scaled transmission power values.

Certain aspects of the present disclosure provide an apparatus for wireless communications. The apparatus generally includes at least one processor configured to scale transmission power of one or more uplink channel symbols to be transmitted in a subframe, utilizing a first set of one or more scaling coefficients, scale transmission power of one or more sounding reference signal (SRS) symbols to be transmitted in the same subframe, utilizing a second set of one or more scaling coefficients, wherein the first set of scaling coefficients is different from the second set of scaling coefficients, and transmit the scaled one or more uplink channel symbols and the scaled one or more SRS symbols utilizing the scaled transmission power values, and a memory coupled to the at least one processor.

Certain aspects provide a computer-program product for wireless communications, comprising a computer-readable medium having instructions stored thereon, the instructions being executable by one or more processors. The instructions generally include instructions for scaling transmission power of one or more uplink channel symbols to be transmitted in a subframe, utilizing a first set of one or more scaling coefficients, instructions for scaling transmission power of one or more sounding reference signal (SRS) symbols to be transmitted in the same subframe, utilizing a second set of one or more scaling coefficients, wherein the first set of scaling coefficients is different from the second set of scaling coefficients, and instructions for transmitting the scaled one or more uplink channel symbols and the scaled one or more SRS symbols utilizing the scaled transmission power values.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
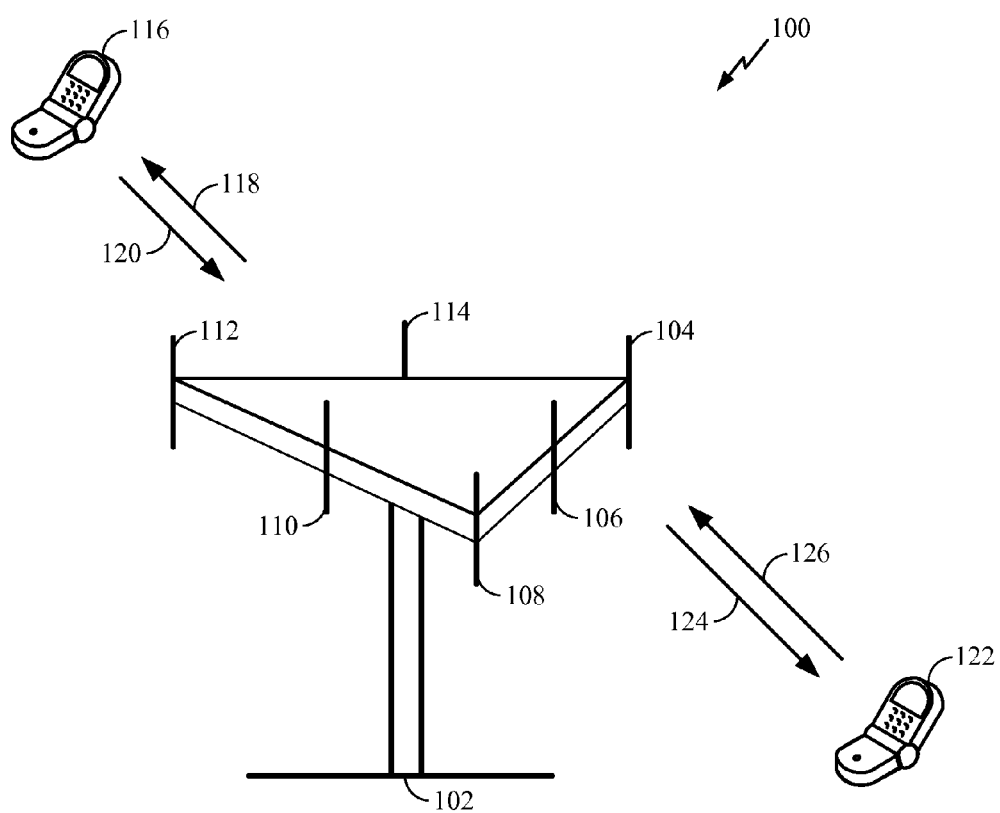
FIG. 1 illustrates an example multiple access wireless communication system in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

AN EXAMPLE WIRELESS COMMUNICATION SYSTEM

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2).

Single carrier frequency division multiple access (SC-FDMA) is a transmission technique that utilizes single carrier modulation at a transmitter side and frequency domain equalization at a receiver side. The SC-FDMA has similar performance and essentially the same overall complexity as those of OFDMA system. However, SC-FDMA signal has lower peak-to-average power ratio (PAPR) because of its inherent single carrier structure. The SC-FDMA has drawn great attention, especially in the uplink communications where lower PAPR greatly benefits the mobile terminal in terms of transmit power efficiency. It is currently a working assumption for uplink multiple access scheme in the 3GPP LTE and the Evolved UTRA.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects the node is a wireless node. Such wireless node may provide, for example, connectivity for or to a network (e.g., a wide area network such as the Internet or a cellular network) via a wired or wireless communication link.

Referring to FIG. 1, a multiple access wireless communication system according to one aspect is illustrated. An access point 100 (AP) may include multiple antenna groups, one group including antennas 104 and 106, another group including antennas 108 and 110, and an additional group including antennas 112 and 114. In FIG. 1, only two antennas are shown for each antenna group, however, more or fewer antennas may be utilized for each antenna group. Access terminal 116 (AT) may be in communication with antennas 112 and 114, where antennas 112 and 114 transmit information to access terminal 116 over forward link 120 and receive information from access terminal 116 over reverse link 118. Access terminal 122 may be in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In one aspect of the present disclosure each antenna group may be designed to communicate to access terminals in a sector of the areas covered by access point 100.

In communication over forward links 120 and 126, the transmitting antennas of access point 100 may utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

Figure 2:
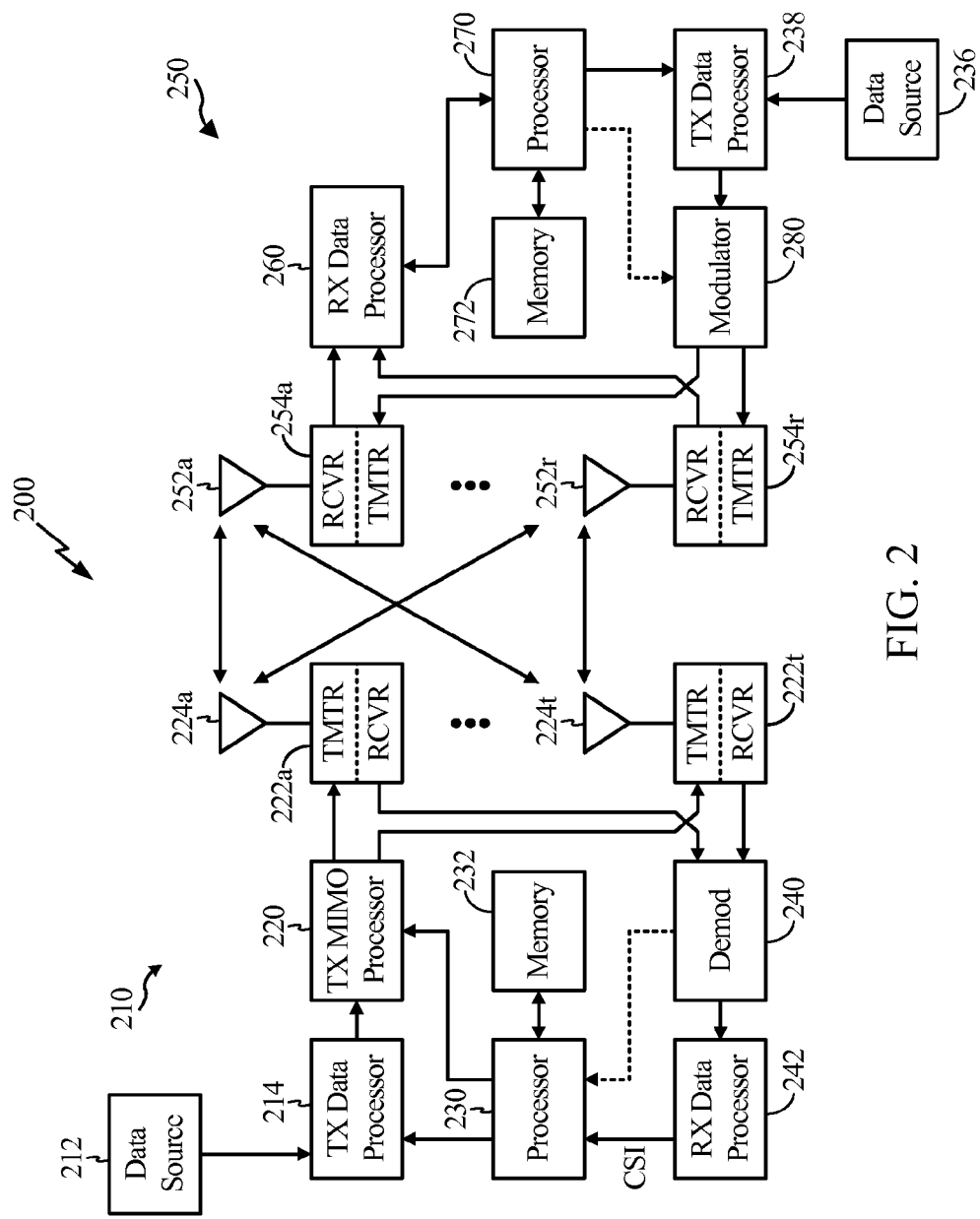
FIG. 2 illustrates a block diagram of an access point and a user terminal in accordance with certain aspects of the present disclosure.

FIG. 2 illustrates a block diagram of an aspect of a transmitter system 210 (also known as the access point) and a receiver system 250 (also known as the access terminal) in a multiple-input multiple-output (MIMO) system 200. At the transmitter system 210, traffic data for a number of data streams is provided from a data source 212 to a transmit (TX) data processor 214.

In one aspect of the present disclosure, each data stream may be transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions stored in memory 232 and performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects of the present disclosure, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals may be received by $N_R$ antennas 252a through 252r and the received signal from each antenna 252 may be provided to a respective receiver (RCVR) 254a through 254r. Each receiver 254 may condition (e.g., filters, amplifies, and down-converts) a respective received signal, digitize the conditioned signal to provide samples, and further process the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 may be complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion using instructions stored in memory 272. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights, and then processes the extracted message.

Figure 3:
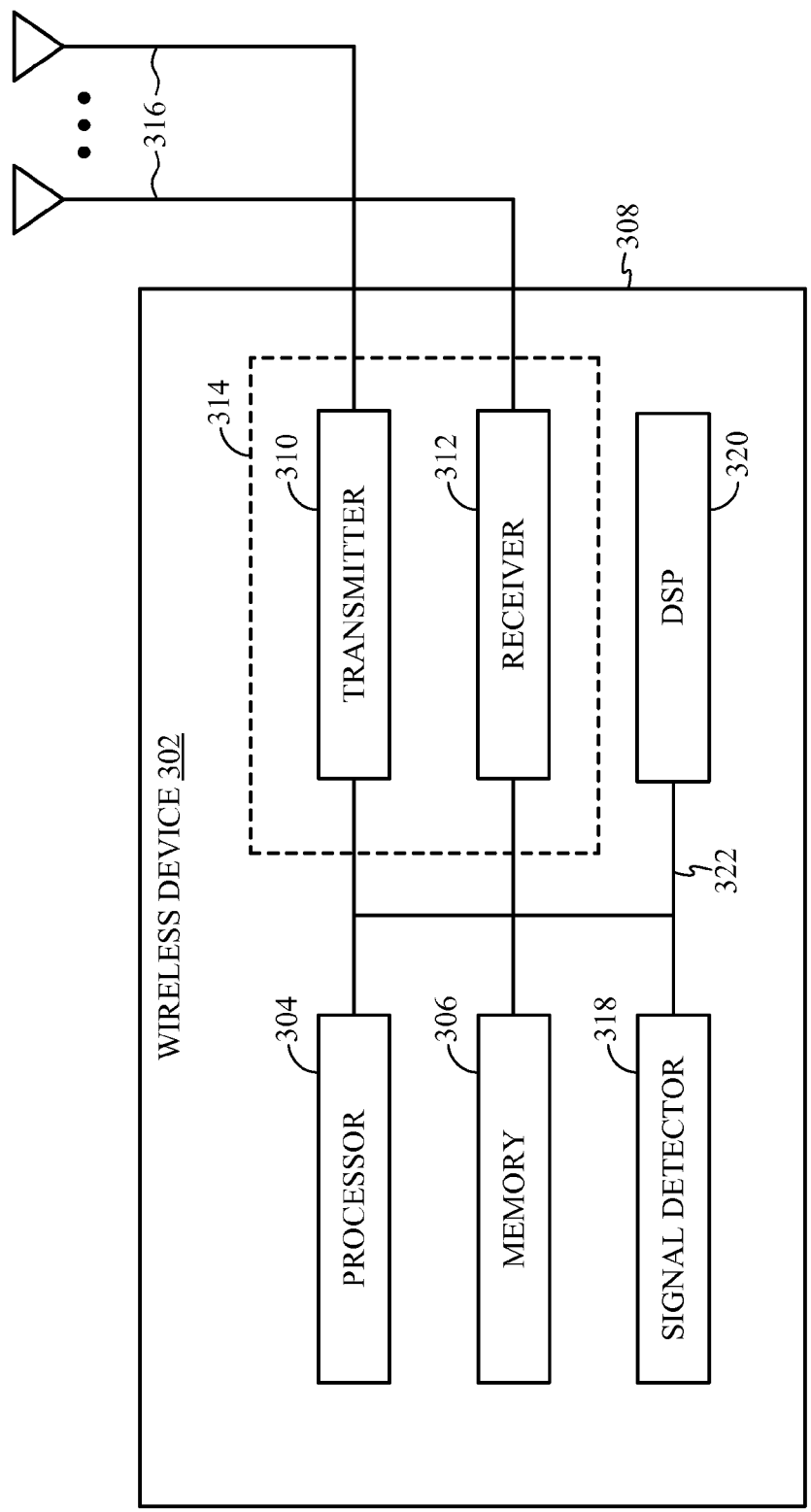
FIG. 3 illustrates various components that may be utilized in a wireless device in accordance with certain aspects of the present disclosure.

FIG. 3 illustrates various components that may be utilized in a wireless device 302 that may be employed within the wireless communication system illustrated in FIG. 1. The wireless device 302 is an example of a device that may be configured to implement the various methods described herein. The wireless device 302 may be a base station 100 or any of user terminals 116 and 122.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314.

The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

In one aspect of the present disclosure, logical wireless communication channels may be classified into control channels and traffic channels. Logical control channels may comprise a Broadcast Control Channel (BCCH) which is a downlink (DL) channel for broadcasting system control information. A Paging Control Channel (PCCH) is a DL logical control channel that transfers paging information. A Multicast Control Channel (MCCH) is a point-to-multipoint DL logical control channel used for transmitting Multimedia Broadcast and Multicast Service (MBMS) scheduling and control information for one or several Multicast Traffic Channels (MTCHs). Generally, after establishing Radio Resource Control (RRC) connection, the MCCH may be only used by user terminals that receive MBMS. A Dedicated Control Channel (DCCH) is a point-to-point bi-directional logical control channel that transmits dedicated control information and it is used by user terminals having an RRC connection. Logical traffic channels may comprise a Dedicated Traffic Channel (DTCH) which is a point-to-point bi-directional channel dedicated to one user terminal for transferring user information. Furthermore, logical traffic channels may comprise a Multicast Traffic Channel (MTCH), which is a point-to-multipoint DL channel for transmitting traffic data.

Transport channels may be classified into DL and UL channels. DL transport channels may comprise a Broadcast Channel (BCH), a Downlink Shared Data Channel (DL-SDCH) and a Paging Channel (PCH). The PCH may be utilized for supporting power saving at the user terminal (i.e., Discontinuous Reception (DRX) cycle may be indicated to the user terminal by the network), broadcasted over entire cell and mapped to physical layer (PHY) resources which can be used for other control/traffic channels. The UL transport channels may comprise a Random Access Channel (RACH), a Request Channel (REQCH), an Uplink Shared Data Channel (UL-SDCH) and a plurality of PHY channels.

The PHY channels may comprise a set of DL channels and UL channels. The DL PHY channels may comprise: Common Pilot Channel (CPICH), Synchronization Channel (SCH), Common Control Channel (CCCH), Shared DL Control Channel (SDCCH), Multicast Control Channel (MCCH), Shared UL Assignment Channel (SUACH), Acknowledgement Channel (ACKCH), DL Physical Shared Data Channel (DL-PSDCH), UL Power Control Channel (UPCCH), Paging Indicator Channel (PICH), and Load Indicator Channel (LICH). The UL PHY Channels may comprise: Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH), and Broadband Pilot Channel (BPICH).

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

Figure 4:
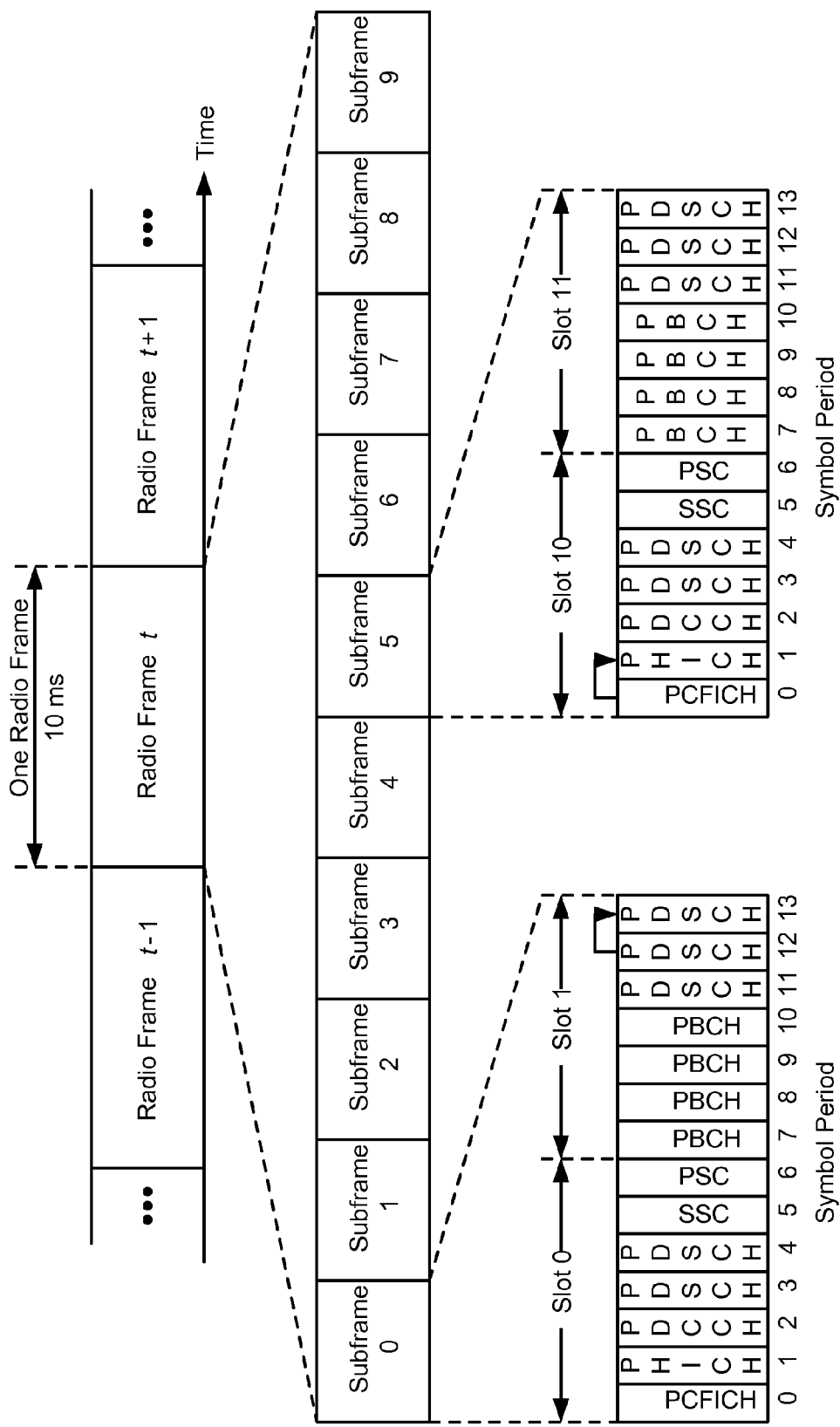
FIG. 4 is a block diagram conceptually illustrating an example of a down link frame structure in a telecommunications system.

FIG. 4 shows a down link frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 4) or 14 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNodeB may send a primary synchronization signal (PSS) and a secondary synchronization signal (SSS) for each cell in the eNodeB. The primary and secondary synchronization signals may be sent in symbol periods 6 and 5, respectively, in each of subframes 0 and 5 of each radio frame with the normal cyclic prefix, as shown in FIG. 4. The synchronization signals may be used by UEs for cell detection and acquisition. The eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in only a portion of the first symbol period of each subframe, although depicted in the entire first symbol period in FIG. 4. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 4, M=3. The eNodeB may send a Physical HARQ Indicator Channel (PHICH) and a Physical Downlink Control Channel (PDCCH) in the first M symbol periods of each subframe (M=3 in FIG. 4). The PHICH may carry information to support hybrid automatic retransmission (HARQ). The PDCCH may carry information on uplink and downlink resource allocation for UEs and power control information for uplink channels. Although not shown in the first symbol period in FIG. 4, it is understood that the PDCCH and PHICH are also included in the first symbol period. Similarly, the PHICH and PDCCH are also both in the second and third symbol periods, although not shown that way in FIG. 4. The eNodeB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNodeB may send the PSS, SSS and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to specific UEs in specific portions of the system bandwidth. The eNodeB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Carrier Aggregation

LTE-Advanced UEs use spectrum up to 20 Mhz bandwidths allocated in a carrier aggregation of up to a total of 100 Mhz (5 component carriers) used for transmission in each direction. Generally, less traffic is transmitted on the uplink than the downlink, so the uplink spectrum allocation may be smaller than the downlink allocation. For example, if 20 Mhz is assigned to the uplink, the downlink may be assigned 100 Mhz. These asymmetric FDD assignments will conserve spectrum and are a good fit for the typically asymmetric bandwidth utilization by broadband subscribers.

Carrier Aggregation Types

Figure 5A:
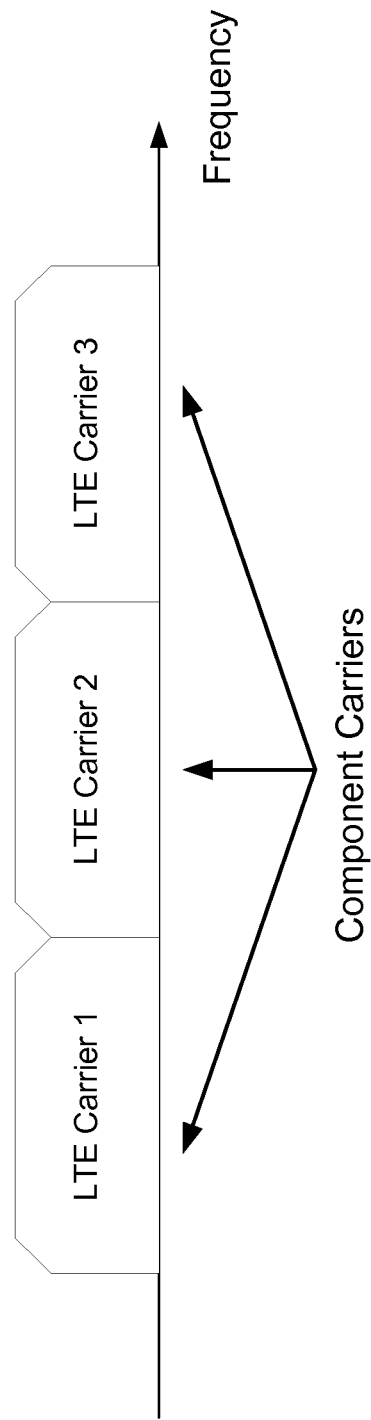
FIG. 5A discloses a continuous carrier aggregation type.
Figure 5B:
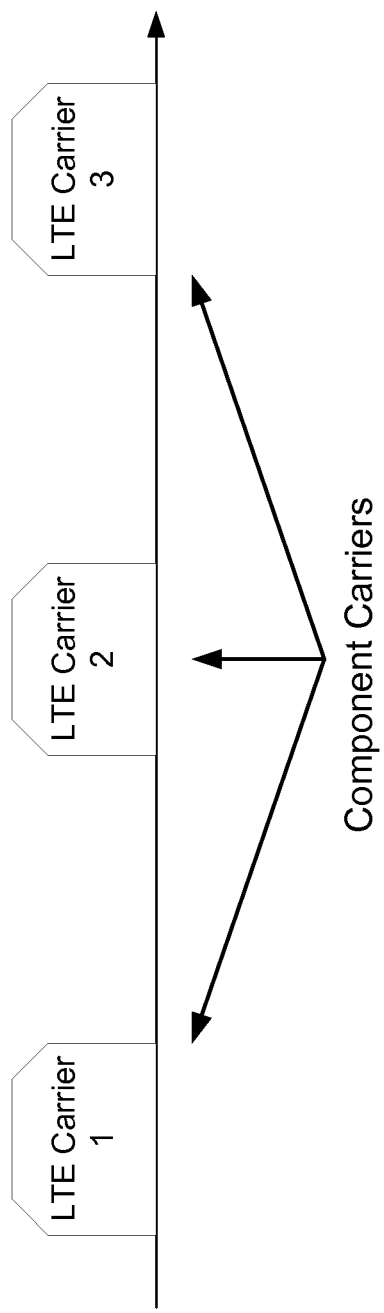
FIG. 5B discloses a non-continuous carrier aggregation type.

For the LTE-Advanced mobile systems, two types of carrier aggregation (CA) methods have been proposed, continuous CA and non-continuous CA. They are illustrated in FIGS. 5A and 5B. Non-continuous CA occurs when multiple available component carriers are separated along the frequency band (FIG. 5B). On the other hand, continuous CA occurs when multiple available component carriers are adjacent to each other (FIG. 5A). Both non-continuous and continuous CA aggregate multiple LTE/component carriers to serve a single unit of LTE Advanced UE.

Multiple RF receiving units and multiple FFTs may be deployed with non-continuous CA in LTE-Advanced UE since the carriers are separated along the frequency band. Because non-continuous CA supports data transmissions over multiple separated carriers across a large frequency range, propagation path loss, Doppler shift and other radio channel characteristics may vary a lot at different frequency bands.

Thus, to support broadband data transmission under the non-continuous CA approach, methods may be used to adaptively adjust coding, modulation and transmission power for different component carriers. For example, in an LTE-Advanced system where the enhanced NodeB (eNodeB) has fixed transmitting power on each component carrier, the effective coverage or supportable modulation and coding of each component carrier may be different.

Data Aggregation Schemes

Figure 6:
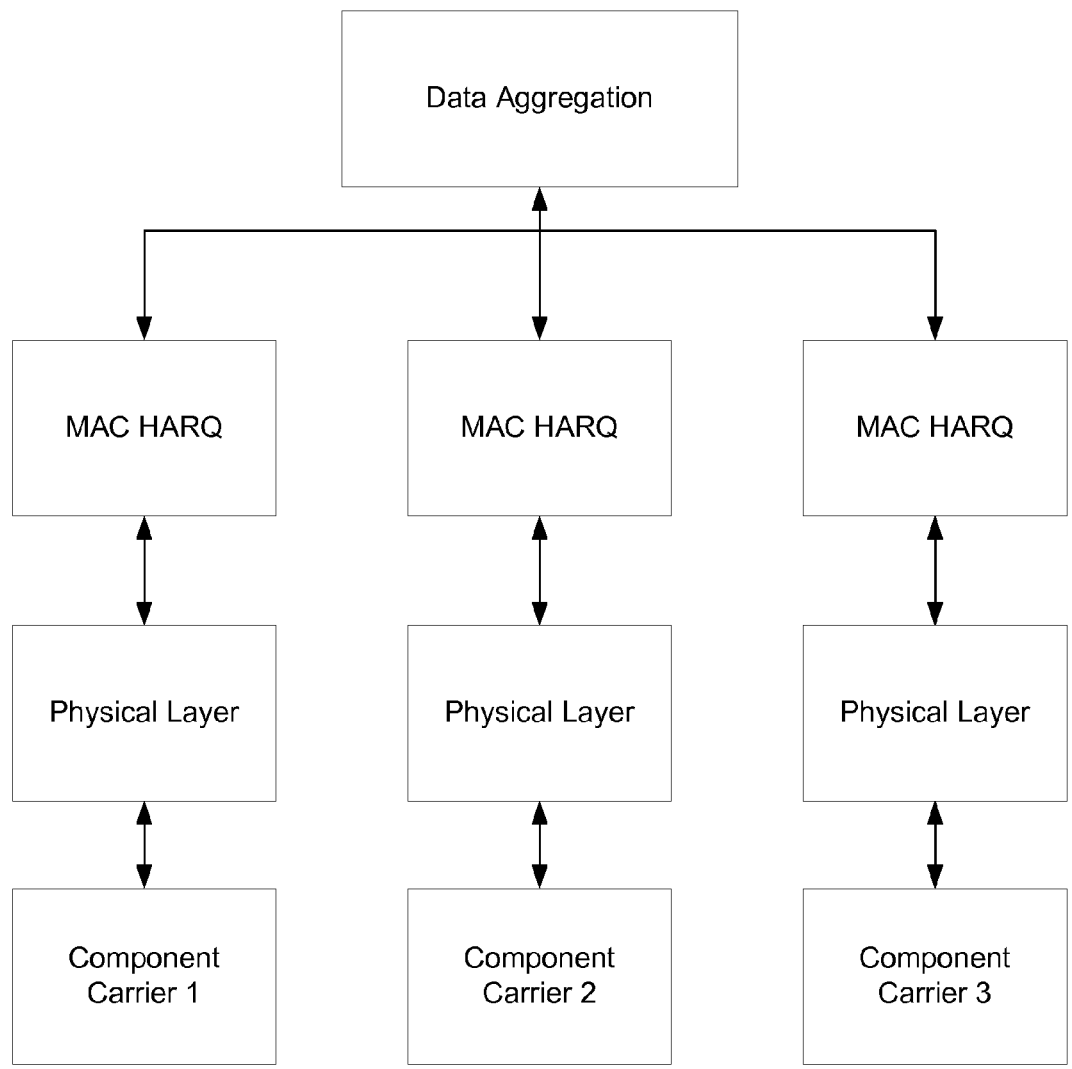
FIG. 6 discloses MAC layer data aggregation.

FIG. 6 illustrates aggregating transmission blocks (TBs) from different component carriers at the medium access control (MAC) layer (FIG. 6) for an IMT-Advanced system. With MAC layer data aggregation, each component carrier has its own independent hybrid automatic repeat request (HARQ) entity in the MAC layer and its own transmission configuration parameters (e.g., transmitting power, modulation and coding schemes, and multiple antenna configuration) in the physical layer. Similarly, in the physical layer, one HARQ entity is provided for each component carrier.

Control Signaling

In general, there are three different approaches for deploying control channel signaling for multiple component carriers. The first involves a minor modification of the control structure in LTE systems where each component carrier is given its own coded control channel.

The second method involves jointly coding the control channels of different component carriers and deploying the control channels in a dedicated component carrier. The control information for the multiple component carriers will be integrated as the signaling content in this dedicated control channel. As a result, backward compatibility with the control channel structure in LTE systems is maintained, while signaling overhead in the CA is reduced.

Multiple control channels for different component carriers are jointly coded and then transmitted over the entire frequency band formed by a third CA method. This approach offers low signaling overhead and high decoding performance in control channels, at the expense of high power consumption at the UE side. However, this method is not compatible with LTE systems.

Handover Control

It is preferable to support transmission continuity during the handover procedure across multiple cells when CA is used for IMT-Advanced UE. However, reserving sufficient system resources (i.e., component carriers with good transmission quality) for the incoming UE with specific CA configurations and quality of service (QoS) requirements may be challenging for the next eNodeB. The reason is that the channel conditions of two (or more) adjacent cells (eNodeBs) may be different for the specific UE. In one approach, the UE measures the performance of only one component carrier in each adjacent cell. This offers similar measurement delay, complexity, and energy consumption as that in LTE systems. An estimate of the performance of the other component carriers in the corresponding cell may be based on the measurement result of the one component carrier. Based on this estimate, the handover decision and transmission configuration may be determined.

According to various embodiments, the UE operating in a multicarrier system (also referred to as carrier aggregation) is configured to aggregate certain functions of multiple carriers, such as control and feedback functions, on the same carrier, which may be referred to as a "primary carrier." The remaining carriers that depend on the primary carrier for support are referred to as associated secondary carriers. For example, the UE may aggregate control functions such as those provided by the optional dedicated channel (DCH), the nonscheduled grants, a physical uplink control channel (PUCCH), and/or a physical downlink control channel (PDCCH). Signaling and payload may be transmitted both on the downlink by the eNode B to the UE, and on the uplink by the UE to the eNode B.

In some embodiments, there may be multiple primary carriers. In addition, secondary carriers may be added or removed without affecting the basic operation of the UE, including physical channel establishment and RLF procedures which are layer 2 procedures, such as in the 3GPP technical specification 36.331 for the LTE RRC protocol.

Figure 7:
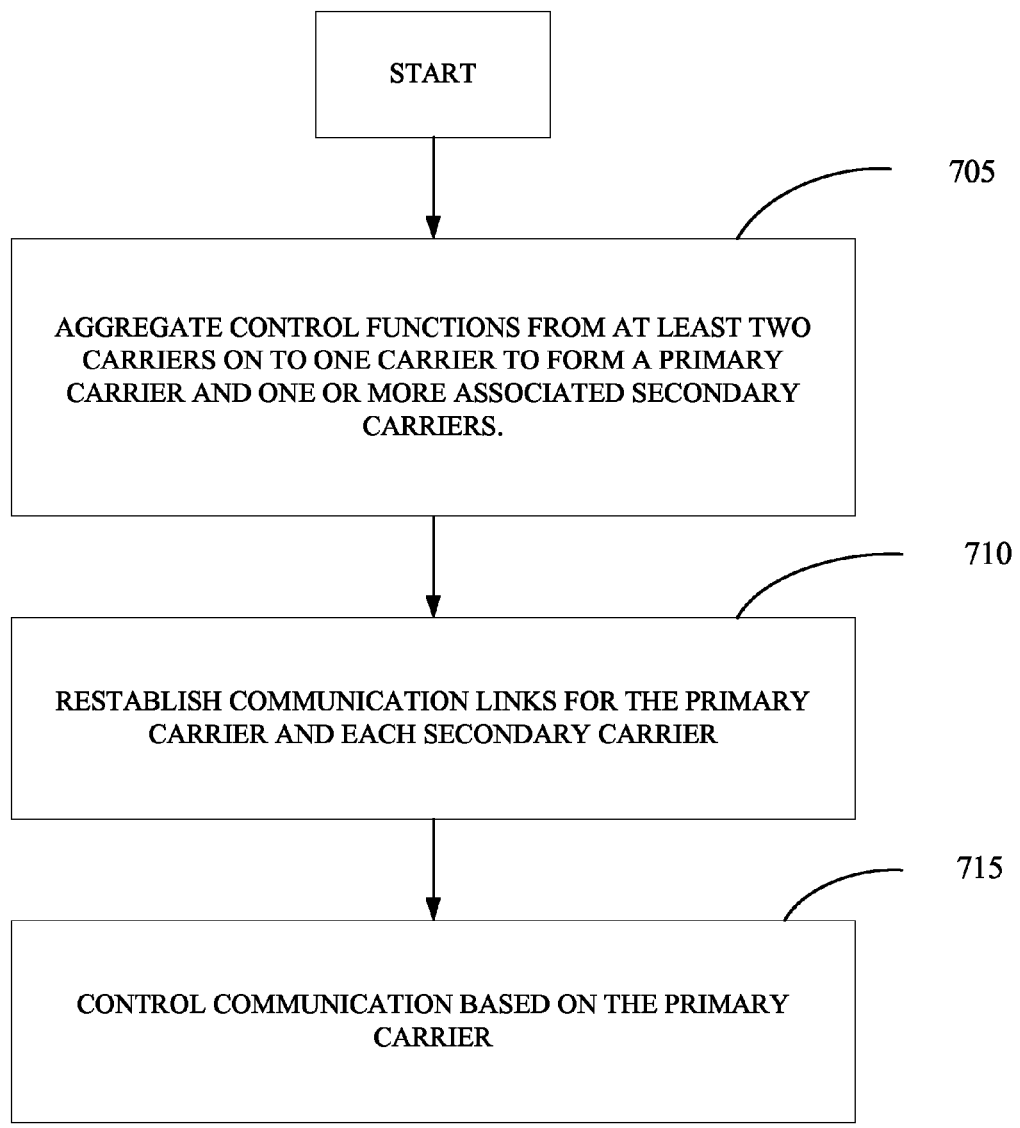
FIG. 7 is a block diagram illustrating a method for controlling radio links in multiple carrier configurations.

FIG. 7 illustrates a method 700 for controlling radio links in a multiple carrier wireless communication system by grouping physical channels according to one example. As shown, the method includes, at block 705, aggregating control functions from at least two carriers onto one carrier to form a primary carrier and one or more associated secondary carriers. Next at block, 710, communication links are established for the primary carrier and each secondary carrier. Then, communication is controlled based on the primary carrier in block 715.

SRS Power Scaling in Carrier Aggregation

In LTE-Advanced, user equipment (UE) can be configured with multiple component carriers (CCs). One CC may be designated as primary component carrier (PCC) to the UE while others may be called secondary component carriers (SCCs) to the UE. The PCC may be configured semi-statically by higher layers for each UE. More specifically, acknowledgement/Negative acknowledgement (ACK/NAK) signals, channel quality indicator (CQI), and scheduling request (SR) information may be transmitted on the PCC over a physical uplink control channel (PUCCH). The SCCs may not carry a PUCCH for a given UE. The LTE-A may further support parallel PUCCHs and physical uplink shared channels (PUSCHs).

A UE may scale power of each channel to limit maximum power usage by the UE. Some of the channels may be given higher priority while scaling the power of different channels. For example, PUSCH with uplink control information (UCI) may be prioritized over PUSCH without UCI (e.g., power of PUSCH without UCI may be scaled down first (e.g., to zero)). Therefore, an example priority order may be as follows:

PUCCH>PUSCH with UCI>PUSCH without UCI.

The prioritization may also be performed regardless of whether the same or different component carriers are utilized.

In present implementations, the UE may scale down the transmit power of each PUSCH when the total transmit power exceeds the maximum allowable transmit power per carrier ($P_{CMAX}$) of the UE. For example, the following power inequality may be used for scaling power of each PUSCH:

$$\sum_c w_c \cdot P_{PUSCHc}(i) \le P_{CMAX} - P_{PUCCH}(i)$$

in which $w_c$ is a scaling factor for PUSCH on carrier c, $P_{PUSCHc}$ represents the power used for PUSCH on carrier c, $P_{PUCCH}$ represents the power used for PUCCH transmissions, and i represents a subframe index.

In LTE time division duplex (TDD), a sounding reference signal (SRS) for a UE may be transmitted either in the last symbol of an uplink (UL) subframe as in LTE TDD, or in one or both symbols of Uplink Pilot Time Slot (UpPTS). When a sounding reference signal (SRS) is transmitted in the last symbol of a frame, if PUSCH is in the same component carrier as the SRS transmission, the last symbol may not be used for PUSCH. Similarly, an SRS may be transmitted in the same component carrier as PUCCH, if the PUCCH uses shortened version of formats 1/1a/1b, which do not use the last symbol. However, if the PUCCH uses other formats such as formats 2/2a/2b or normal versions of the formats 1/1a/1b and the like, the SRS may be dropped.

Figure 8:
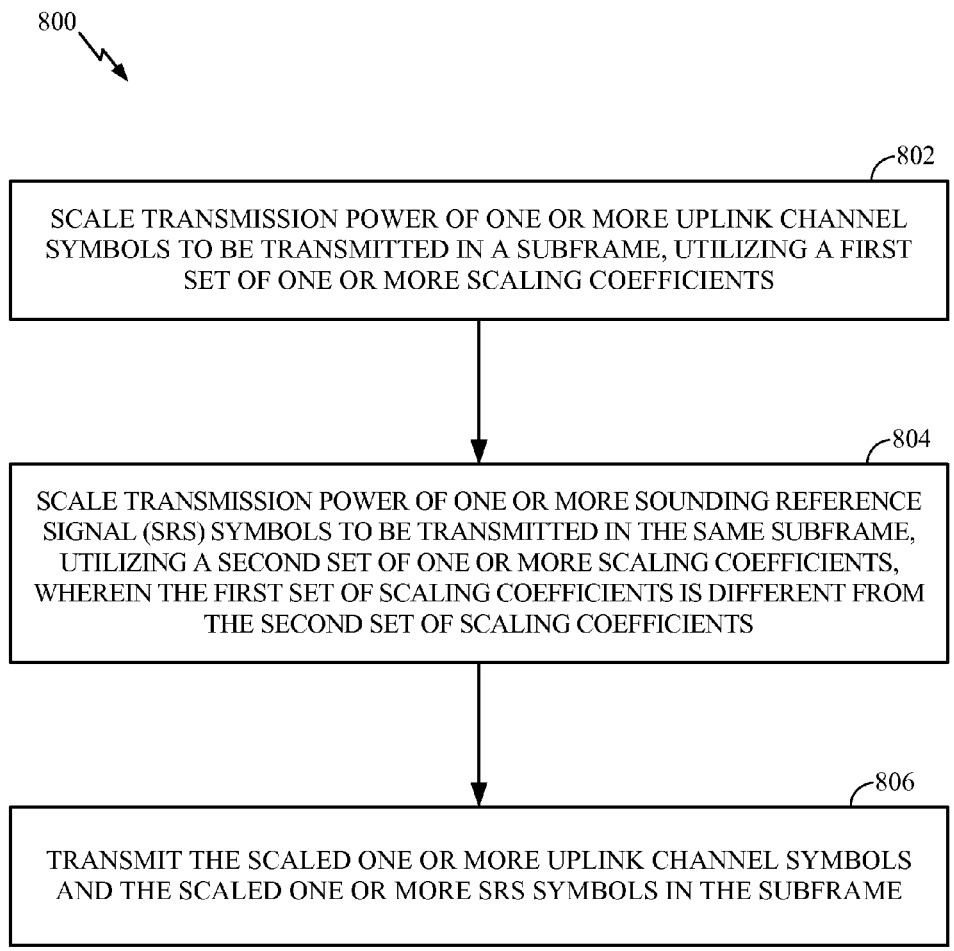
FIG. 8 illustrates an example operation that may be performed by a user equipment in accordance with certain aspects of the present disclosure.

Certain aspects of the present disclosure provide techniques for determining and scaling transmission power while transmitting SRS symbols, for example, either in the last symbol or the SRS symbols in UpPTS in TDD. FIG. 8 illustrates exemplary operations 800 for transmit power allocation that may be performed by a UE, in accordance with aspects of the present disclosure.

The operations begin, at 802, with the UE scaling transmission power of one or more uplink channel symbols to be transmitted in a subframe, utilizing a first set of one or more scaling coefficients. At 804, the UE scales transmission power of one or more sounding reference signal (SRS) symbols to be transmitted in the same subframe, utilizing a second set of one or more scaling coefficients. The first set of scaling coefficients is different from the second set of scaling coefficients. At 806, the UE may transmit the scaled one or more uplink channel symbols and the scaled one or more SRS symbols in the subframe.

According to various aspects, different scenarios are provided for determining transmission power and scaling transmission power while transmitting SRS symbols, for example, either in the last symbol or the SRS symbols in UpPTS in TDD. A first scenario involves scaling power of only SRS transmissions over all component carriers. A second scenario involves scaling power of SRS transmissions in conjunction with PUCCH across all component carriers. A third scenario involves scaling power of SRS transmissions in conjunction with PUSCH across all component carriers. A fourth scenario involves scaling power of SRS, PUCCH and PUSCH transmission across all component carriers.

It should be noted that in the above scenarios a focus may be on the last symbol of a subframe (or the SRS symbols in UpPTS in TDD). Therefore, in scenarios without PUCCH, there may either be no PUCCH transmission or shortened PUCCH formats may be used that do not transmit on the last symbol of a subframe. Similarly, scenarios without PUSCH may result from either no PUSCH transmission, or no PUSCH transmission using the last symbol.

For certain aspects of the present disclosure, power of the SRS symbol may be scaled in a manner that is independent of power of other symbols in a subframe. Therefore, a power control equation may be retained for all physical channels as long as the maximum allowable power is not reached. For each component carrier, a power scaling coefficient similar to the one used for the SRS symbol in the same subframe may be applied to all symbols carrying PUSCH. In such a case, when maximum allowable power for a UE is reached, the SRS power transmission may be given priority over transmissions in PUCCH and/or PUSCH.

For certain aspects of the present disclosure, transmission power of the SRS symbol may be similar to the transmission power of the other symbols in a subframe if a maximum transmission power is reached for the other symbols. As a result, the SRS may be transmitted with maximum power if other symbols in the same subframe are also transmitted with the maximum power.

Considering only SRS channels may be transmitted over all the component carriers (e.g., no transmissions on PUCCH or PUSCH or no transmissions on the last symbol of the subframe), if the total transmit power of the SRS symbol exceeds the maximum transmit power of a UE for each carrier ($P_{CMAX}$), the UE may scale down the transmit power of each SRS transmissions on each of the component carriers such that the following power inequality is satisfied:

$$\Sigma_c V_c * P_{SRSc}(i) \leq P_{CMAX}$$

in which $P_{SRSc}$ represents power of SRS transmission on carrier c and $V_c$ represents scaling coefficient for power of SRS transmission on carrier c. This scaling coefficient may also be different from the scaling coefficient used for PUSCH transmissions.

Regarding the second scenario which involves SRS transmissions in conjunction with PUCCH across all component carriers, when the total transmit power of the last symbol exceeds the maximum transmit power $P_{CMAX}$ of the UE (e.g., power threshold), the UE may scale down the transmit power of each SRS such that the following power inequality is satisfied:

$$\Sigma_c V_c * P_{SRSc}(i) \leq P_{CMAX} - P_{PUCCH}(i)$$

As described above, the third and fourth scenarios involve SRS transmissions in conjunction with PUSCH across all component carriers or SRS, PUCCH and PUSCH transmissions across all component carriers respectively. For these scenarios, the UE may give priority to transmission in PUSCH and/or PUCCH and perform power scaling for SRS transmission using remaining power after enough power is allocated to PUSCH and/or PUCCH transmissions. Therefore, the following power inequality may be satisfied:

$$\Sigma_c V_c * P_{SRSc}(i) \leq P_{CMAX} - P_{PUCCH}(i) - \Sigma_c W_c * P_{PUSCHc}(i)$$

in which $P_{PUSCHc}(i)$ represents the component carrier with PUSCH transmission over the last symbol. It should be noted that in the above formula only PUSCH transmissions that are using the last symbol may be considered.

For certain aspects, the SRS transmission power allocation may be prioritized over PUSCH power allocation. For example, PUSCH power may be scaled for the last symbol, e.g., for quadrature phase-shift keying (QPSK) modulation.

Another alternative for the third and fourth scenarios may be dropping SRS transmission. However, this may not be necessary if there is still room for SRS transmissions.

The power scaling coefficients for SRS ($V_c$) as described in the above equations may be determined similarly to determining power scaling factors for PUSCH ($w_c$). For example, uniform scaling across all component carriers, non-uniform scaling across all component carriers (e.g., giving primary component carrier higher priority, etc.), and scaling in dB or linear domain may be considered. Priority rules may be similar to PUSCH and can be either specified by standard in use or may be left to UE implementation.

Figure 9:
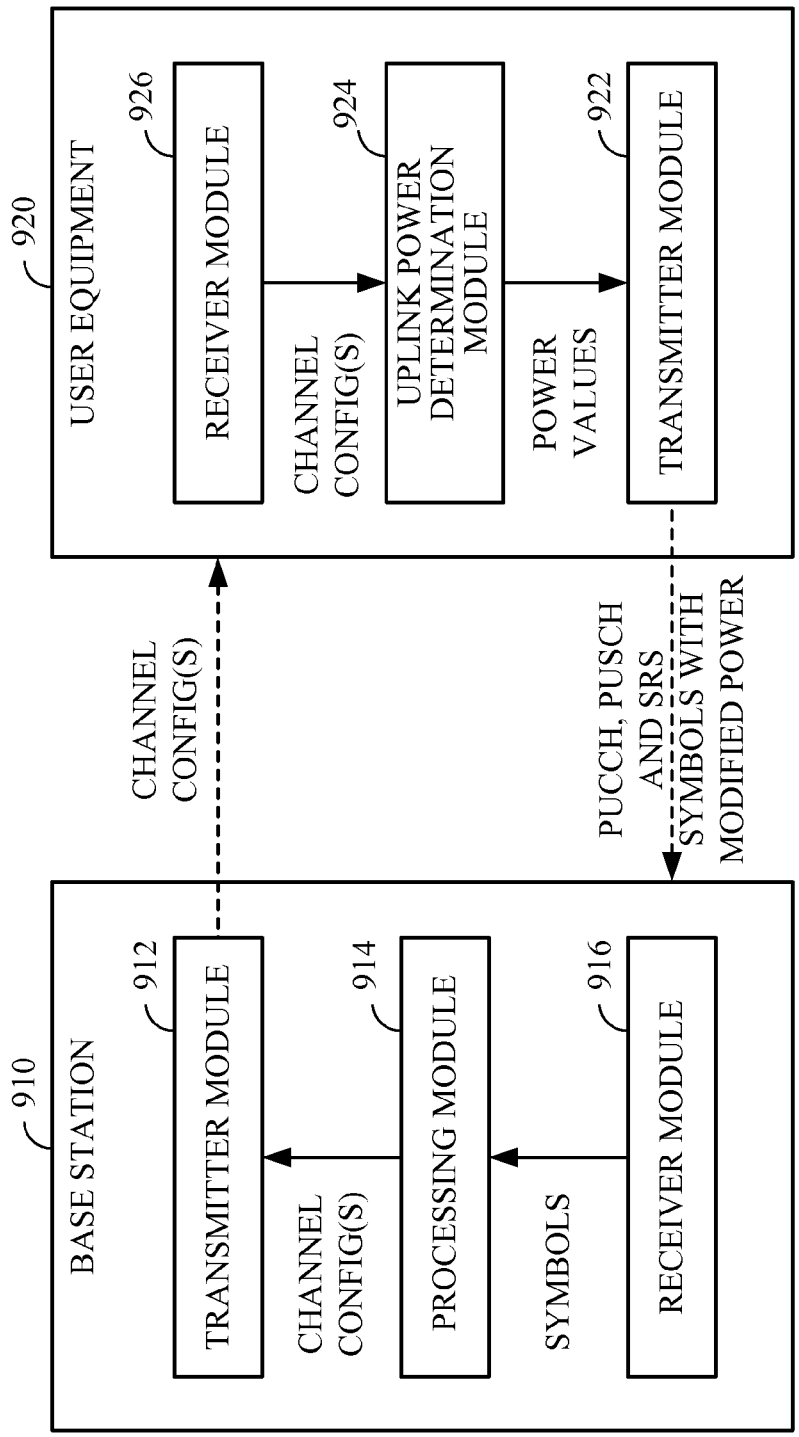
FIG. 9 illustrates a block diagram conceptually illustrating an operation of a base station with a user equipment, in accordance with certain aspects of the present disclosure.

FIG. 9 illustrates an example system 900 with a base station 910 and a user equipment 920 capable of performing the power scaling techniques in accordance with certain aspects of the present disclosure. As illustrated, the base station 910 may include a transmitter module 912 for transmitting control and channel configuration messages to the UE 920.

The UE 920 may receives the channel configuration with a receiver module 926 and determine an amount of power that should be used for transmissions over a plurality of component carriers utilizing the uplink power determining module 924. The uplink power determining module 924 may utilize any technique or combination of techniques described above to determine scaling coefficients for scaling transmission power used for PUSCH and PUCCH transmissions over each component carrier.

The uplink power determining module 924 may also determine transmit power for SRS transmissions over the last symbol of a subframe or the SRS symbols in UpPTS in TDD by determining scaling coefficients for the SRS transmissions over each component carrier. The UE may give priority to determining transmit power for either SRS symbols or PUCCH/PUSCH symbols. The transmitter module 922 transmits SRS symbols and PUSCH/PUCCH symbols utilizing the determined/scaled power values. The base station 910 receives the symbols with a receiver module 916 and processes the received symbols utilizing the processing module 914. The processing module 914 may also determine channel configuration signals for uplink transmissions from the UE.

The various operations of methods described above may be performed by any suitable means capable of performing the corresponding functions. The means may include various hardware and/or software component(s) and/or module(s), including, but not limited to a circuit, an application specific integrate circuit (ASIC), or processor. The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for wireless communications, comprising:
   scaling, by a user equipment (UE), transmission power of one or more uplink channel symbols to be transmitted in a subframe, utilizing a first set of one or more scaling coefficients;
   scaling, by the UE, transmission power of one or more sounding reference signal (SRS) symbols to be transmitted in a same subframe, utilizing a second set of one or more scaling coefficients, wherein the first set of one or more scaling coefficients is different from the second set of one or more scaling coefficients, wherein the transmission power of the one or more SRS symbols is uniformly scaled across multiple component carriers;
   wherein the transmission power of the one or more SRS symbols and the transmission power of the one or more uplink channel symbols are scaled independently of each other in response to a determination that a maximum transmission power has been reached; and
   transmitting, by the UE, the scaled one or more uplink channel symbols and the scaled one or more SRS symbols utilizing the scaled transmission power.

2. The method of claim 1, wherein the transmitting comprises transmitting on the multiple component carriers.

3. The method of claim 1, wherein the second set of one or more scaling coefficients are determined independently from the first set of one or more scaling coefficients.

4. The method of claim 1, wherein scaling transmission power of the one or more uplink channel symbols to be transmitted in the subframe comprises utilizing a same scaling coefficient for all uplink shared channel symbols sent on a common component carrier.

5. The method of claim 1, further comprising:
   determining a priority between the scaling the transmission power of the one or more uplink channel symbols and the scaling the transmission power of the one or more SRS symbols in response to the determination that the maximum transmission power has been reached.

6. The method of claim 1, further comprising:
   determining the second set of one or more scaling coefficients for transmission of one or more SRS symbols; and
   allocating a remaining transmission power when determining the first set of one or more scaling coefficients for transmission of the one or more uplink channel symbols, wherein the remaining transmission power comprises the maximum transmission power minus a power allocated for transmission of one or more SRS symbols.

7. The method of claim 1, further comprising:
   determining the first set of one or more scaling coefficients for transmission of the one or more uplink channel symbols; and
   allocating a remaining transmission power when determining the second set of one or more scaling coefficients for transmission of one or more SRS symbols, wherein the remaining transmission power comprises the maximum transmission power minus a power allocated for transmission of the one or more uplink channel symbols.

8. The method of claim 1, further comprising:
transmitting the one or more SRS symbols utilizing a maximum power if the transmission power of the one or more uplink channel symbols is equal to or greater than a threshold.

9. The method of claim 1, wherein scaling transmission power of the one or more SRS symbols comprises:
determining a total transmit power allocated to transmission of the one or more SRS symbols; and
if the total transmit power exceeds a maximum transmission power per carrier, determining the second set of one or more scaling coefficients such that a sum of one or more scaled transmission power values for transmission of one or more SRS symbols on a plurality of component carriers is smaller than or equal to a predefined value.

10. The method of claim 9, wherein the predefined value is the maximum transmission power per carrier.

11. The method of claim 9, wherein the predefined value is the maximum transmission power per carrier minus a total power allocated to transmission in uplink control channel.

12. The method of claim 9, wherein the predefined value is the maximum transmission power per carrier minus a total power allocated to transmission in uplink control channel minus the total power allocated to transmissions in uplink shared channels for the plurality of component carriers.

13. An apparatus for wireless communications, comprising:
means for scaling transmission power of one or more uplink channel symbols to be transmitted in a subframe, utilizing a first set of one or more scaling coefficients;
means for scaling transmission power of one or more sounding reference signal (SRS) symbols to be transmitted in a same subframe, utilizing a second set of one or more scaling coefficients, wherein the first set of one or more scaling coefficients is different from the second set of one or more scaling coefficients, wherein the transmission power of the one or more SRS symbols is uniformly scaled across multiple component carriers;
wherein the transmission power of the one or more SRS symbols and the transmission power of the one or more uplink channel symbols are scaled independently of each other in response to a determination that a maximum transmission power has been reached; and
means for transmitting the scaled one or more uplink channel symbols and the scaled one or more SRS symbols utilizing the scaled transmission power.

14. The apparatus of claim 13, wherein the means for transmitting comprises transmitting on the multiple component carriers.

15. The apparatus of claim 13, wherein the second set of one or more scaling coefficients are determined independently from the first set of one or more scaling coefficients.

16. The apparatus of claim 13, wherein the means for scaling transmission power of the one or more uplink channel symbols to be transmitted in the subframe comprises means for utilizing a same scaling coefficient for all uplink shared channel symbols sent on a common component carrier.

17. The apparatus of claim 13, further comprising:
means for determining a priority between the scaling the transmission power of the one or more uplink channel symbols and the scaling the transmission power of the one or more SRS symbols in response to the determination that the maximum transmission power has been reached.

18. The apparatus of claim 13, further comprising:
means for determining the second set of one or more scaling coefficients for transmission of one or more SRS symbols; and
means for allocating a remaining transmission power when determining the first set of one or more scaling coefficients for transmission of the one or more uplink channel symbols, wherein the remaining transmission power comprises the maximum transmission power minus a power allocated for transmission of one or more SRS symbols.

19. The apparatus of claim 13, further comprising:
means for determining the first set of one or more scaling coefficients for transmission of the one or more uplink channel symbols; and
means for allocating a remaining transmission power when determining the second set of one or more scaling coefficients for transmission of one or more SRS symbols, wherein the remaining transmission power comprises the maximum transmission power minus a power allocated for transmission of the one or more uplink channel symbols.

20. The apparatus of claim 13, further comprising:
means for determining if the transmission power of the one or more uplink channel symbols is equal to or greater than a threshold, and
means for transmitting the one or more SRS symbols utilizing a maximum power.

21. The apparatus of claim 13, wherein the means for scaling transmission power of the one or more SRS symbols comprises:
means for determining a total transmit power allocated to transmission of the one or more SRS symbols; and
if the total transmit power exceeds a maximum transmission power per carrier, means for determining the second set of one or more scaling coefficients such that a sum of one or more scaled transmission power values for transmission of SRS symbols on a plurality of component carriers is smaller than or equal to a predefined value.

22. The apparatus of claim 21, wherein the predefined value is the maximum transmission power per carrier.

23. The apparatus of claim 21, wherein the predefined value is the maximum transmission power per carrier minus a total power allocated to transmission in uplink control channel.

24. The apparatus of claim 21, wherein the predefined value is the maximum transmission power per carrier minus a total power allocated to transmission in uplink control channel minus the total power allocated to transmissions in uplink shared channels for the plurality of component carriers.

25. An apparatus for wireless communications, comprising:
at least one processor configured to scale transmission power of one or more uplink channel symbols to be transmitted in a subframe, utilizing a first set of one or more scaling coefficients, scale transmission power of one or more sounding reference signal (SRS) symbols to be transmitted in a same subframe, utilizing a second set of one or more scaling coefficients, wherein the first set of one or more scaling coefficients is different from the second set of one or more scaling coefficients, wherein the transmission power of the one or more SRS symbols is uniformly scaled across multiple component carriers, and transmit the scaled one or more uplink channel symbols and the scaled one or more SRS symbols utilizing the scaled transmission power, wherein the transmission power of the one or more SRS symbols and the transmission power of the one or more uplink channel symbols are scaled independently of each other in response to a determination that a maximum transmission power has been reached; and a memory coupled to the at least one processor.

26. The apparatus of claim 25, wherein the processor is further configured to transmit on the multiple component carriers.

27. The apparatus of claim 25, wherein the second set of one or more scaling coefficients are determined independently from the first set of one or more scaling coefficients.

28. The apparatus of claim 25, wherein the processor configured to scale transmission power of the one or more uplink channel symbols is further configured to utilize a same scaling coefficient for all uplink shared channel symbols sent on a common component carrier.

29. The apparatus of claim 25, wherein the processor is further configured to determine a priority between the scaling the transmission power of the one or more uplink channel symbols and the scaling the transmission power of the one or more SRS symbols in response to the determination that the maximum transmission power has been reached.

30. The apparatus of claim 25, wherein the processor is further configured to determine the second set of one or more scaling coefficients for transmission of one or more SRS symbols, and allocate a remaining transmission power when determining the first set of one or more scaling coefficients for transmission of the one or more uplink channel symbols, wherein the remaining transmission power comprises the maximum transmission power minus a power allocated for transmission of one or more SRS symbols.

31. The apparatus of claim 25, wherein the processor is further configured to determine the first set of one or more scaling coefficients for transmission of the one or more uplink channel symbols, and allocate a remaining transmission power when determining the second set of one or more scaling coefficients for transmission of one or more SRS symbols, wherein the remaining transmission power comprises the maximum transmission power minus a power allocated for transmission of the one or more uplink channel symbols.

32. The apparatus of claim 25, wherein the processor is further configured to transmit the one or more SRS symbols utilizing a maximum power if the transmission power of the one or more uplink channel symbols is equal to or greater than a threshold.

33. The apparatus of claim 25, wherein the processor configured to scale transmission power of the one or more SRS symbols is further configured to determine a total transmit power allocated to transmission of the one or more SRS symbols, and if the total transmit power exceeds a maximum transmission power per carrier, determine the second set of one or more scaling coefficients such that a sum of one or more scaled transmission power values for transmission of one or more SRS symbols on a plurality of component carriers is smaller than or equal to a predefined value.

34. The apparatus of claim 33, wherein the predefined value is the maximum transmission power per carrier.

35. The apparatus of claim 33, wherein the predefined value is the maximum transmission power per carrier minus a total power allocated to transmission in uplink control channel.

36. The apparatus of claim 33, wherein the predefined value is the maximum transmission power per carrier minus a total power allocated to transmission in uplink control channel minus the total power allocated to transmissions in uplink shared channels for the plurality of component carriers.

37. A computer-program product for wireless communications, comprising a non-transitory computer readable medium having instructions stored thereon, the instructions being executable by one or more processors and the instructions comprising:

instructions for scaling transmission power of one or more uplink channel symbols to be transmitted in a subframe, utilizing a first set of one or more scaling coefficients;

instructions for scaling transmission power of one or more sounding reference signal (SRS) symbols to be transmitted in a same subframe, utilizing a second set of one or more scaling coefficients, wherein the first set of one or more scaling coefficients is different from the second set of one or more scaling coefficients, wherein the transmission power of the one or more SRS symbols is uniformly scaled across multiple component carriers;

wherein the transmission power of the one or more SRS symbols and the transmission power of the one or more uplink channel symbols are scaled independently of each other in response to a determination that a maximum transmission power has been reached; and instructions for transmitting the scaled one or more uplink channel symbols and the scaled one or more SRS symbols utilizing the scaled transmission power.

* * * * *